(No Model.)
C. B. WOOD.
LUBRICATOR.
No. 502,158.
Patented July 25, 1893.
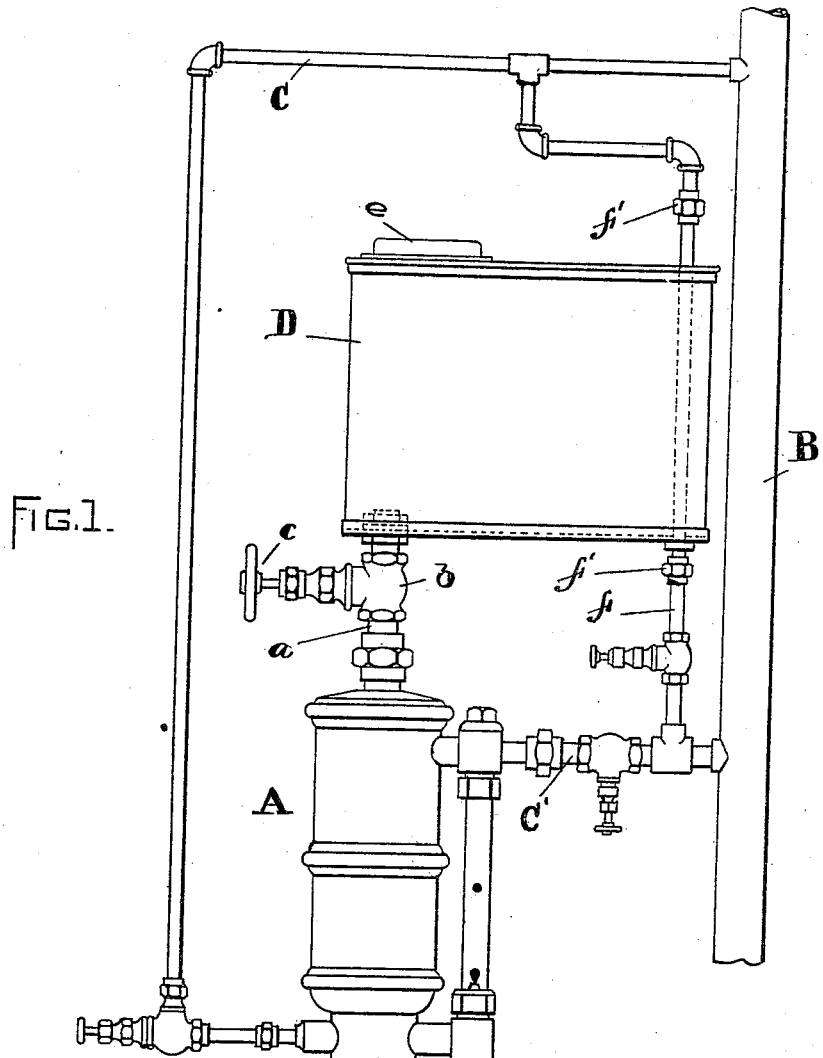
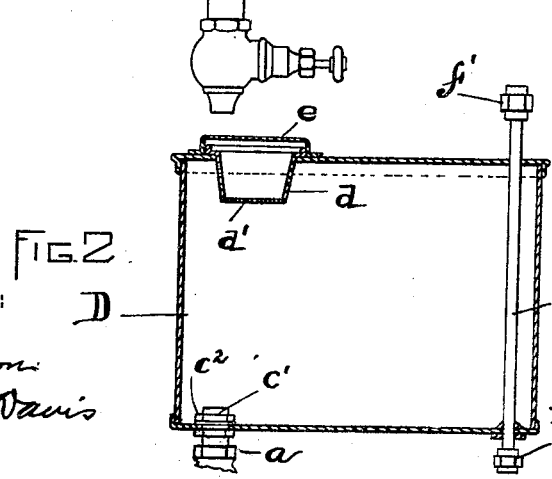
WITNESSES:
A. D. Hanson
S. Parker Davis
INVENTOR:
C. B. Wood,
by Wright, Brown & Crossley,
Attys.

UNITED STATES PATENT OFFICE.

CLARK B. WOOD, OF BOSTON, MASSACHUSETTS, ASSIGNOR OF ONE-HALF TO CHARLES A. JEWETT, OF SAME PLACE.

LUBRICATOR.

SPECIFICATION forming part of Letters Patent No. 502,158, dated July 25, 1893.

Application filed February 6, 1893. Serial No. 461,143. (No model.)

*To all whom it may concern:*

Be it known that I, CLARK B. WOOD, of Boston, in the county of Suffolk and State of Massachusetts, have invented certain new and useful Improvements in Filling-Reservoirs for Sight-Feed Lubricating-Cups, of which the following is a specification.

The object of the present invention is to provide a construction whereby a filling-reservoir may be inserted in any sight-feed lubricating apparatus at small expense and without involving any rearrangement of parts of the lubricator or change in the construction of the cup, or molestation of the main steam-supply pipe.

Reference is to be had to the annexed drawings and to the letters marked thereon, forming a part of this specification, the same letters designating the same parts or features, as the case may be, wherever they occur.

Figure 1 shows a side elevation of the complete lubricating apparatus. Fig. 2 shows a section of the oil-supply reservoir, and the nozzle of the pipe connecting it with the oil-cup.

The reference letter A designates an oil-cup of well-known form; B, a steam-supply pipe; and C C', two pipes connecting the oil-cup and said supply pipe, the pipe C extending laterally from the supply pipe B at a point above the cup, and thence downwardly to the lower end of the cup, where it communicates with the latter and supplies the condensation for displacement of the oil; and the pipe C' extending laterally from the cup to the supply pipe, and being the channel through which the oil is fed to the part to be lubricated.

In carrying out my invention, I insert a T in the lateral or horizontal portion of the pipe C, and also in the pipe C'; and in the threaded hole which will be found in the top of the oil-cup A, and which ordinarily receives a filling-cap, I insert a pipe $a$, providing the same with a valve $c$ and union $b$.

A reservoir D is fitted in above the oil-cup A, and joined to the pipe $a$ rising from the top of said cup and to the T's in the pipes C and C', by means of a pipe $f$, said reservoir being supported by said pipes $a$ and $f$. The pipe $a$ opens into the bottom of the reservoir, as shown at $c'$ in Fig. 2, and is fastened to the reservoir bottom by a nut $c^2$. A section of the pipe $f$ passes through the reservoir, and is permanently fastened therein, as indicated in Fig. 2, and this section is joined with the other sections of the pipe above and below the reservoir by unions $f'$. A valve is inserted at a suitable place in the pipe $f$, and when this valve is open, there is a constant circulation of steam through the pipe, which keeps the oil in the reservoir warm and prevents it from congealing.

It will be seen that, with the above construction, the reservoir may be fitted in without disturbing the oil-cup or the steam-supply pipe.

The operation of the lubricating apparatus in supplying the lubricant to the part to be oiled is the same as usual. During this operation, the cock $c$ is closed, shutting off communication between the reservoir and the cup. When all the oil has been discharged from the cup and it is desired to replenish the same, the water of condensation, which has accumulated in the cup and displaced the oil, is drawn off through a pet-cock at the bottom of the cup, and then the cock $c$ is opened and the cup is filled from the reservoir D. The reservoir has a filling-cup $d$ in its top, the bottom $d'$ of said cup constituting a strainer, and the cup being covered by a cap $e$.

Having thus explained the nature of the invention and described a way of constructing and using the same, although without attempting to set forth all of the forms in which it may be made or all of the modes of its use, it is declared that what is claimed is—

The combination with a steam-supply pipe, an oil-cup, a condensing pipe connecting the said steam-supply pipe and the oil-cup and having a horizontal portion extending above the oil-cup, and a feed-pipe connecting the oil-cup and steam-supply pipe and extending horizontally, of a filling-reservoir supported above the oil-cup independent of the steam-supply pipe, a pipe connecting the bottom of the reservoir with the top of the oil-cup and having a valve, and a pipe extending through the reservoir and joined above and below the same to the condensing and feed pipes, said pipe being composed of sections, one of which is carried by the reservoir.

In testimony whereof I have signed my name to this specification, in the presence of two subscribing witnesses, this 9th day of January, A. D. 1893.

CLARK B. WOOD.

Witnesses:
ARTHUR W. CROSSLEY,
F. PARKER DAVIS.